Dec. 19, 1933.  E. J. W. RAGSDALE  1,940,100

VEHICLE BRAKE

Filed June 27, 1930

INVENTOR.
EARL J. W. RAGSDALE
BY
John P. Tarbox
ATTORNEY.

Patented Dec. 19, 1933

1,940,100

UNITED STATES PATENT OFFICE 1,940,100

VEHICLE BRAKE

Earl J. W. Ragsdale, Norristown, Pa., assignor to Budd Wheel Company, Philadelphia, Pa., a corporation of Pennsylvania Application June 27, 1930. Serial No. 464,131

11 Claims. (Cl. 188—78)

My invention pertains to the art of brakes and is especially, though not exclusively, adapted to vehicle wheels in which the tire is mounted directly upon the hub. This type of wheel has recently become very popular as an airplane wheel.

The braking of these wheels presents a difficult problem, due to the small space afforded within the peripheral walls. It has been my object to provide a brake for a wheel of this character involving a compact and simple arrangement of the parts, providing a large braking surface, the brake being economical to manufacture by reason of its essential simplicity. I have attained these objects by forming a braking surface directly upon the inner wall of the hub and actuating an internal band brake against this braking surface by means of a simple arrangement of pinions operated from a shaft co-axial with the wheel.

Other objects of my invention will be obvious from a reading of the subjoined specification in the light of the attached drawing, in which.

Figure 1:
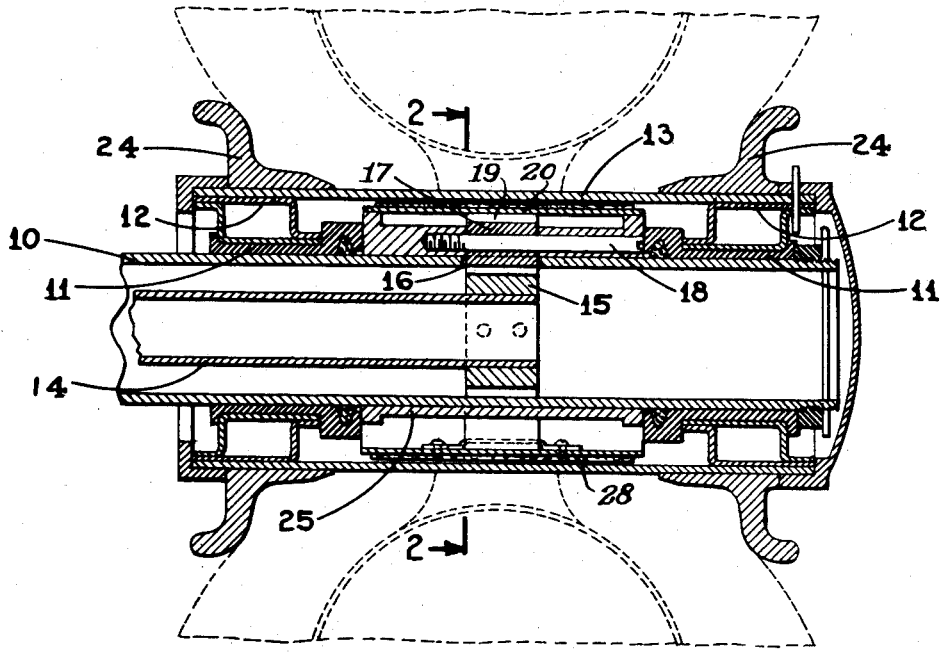
Figure 1 is an axial section through my improved wheel and brake.
Figure 2:
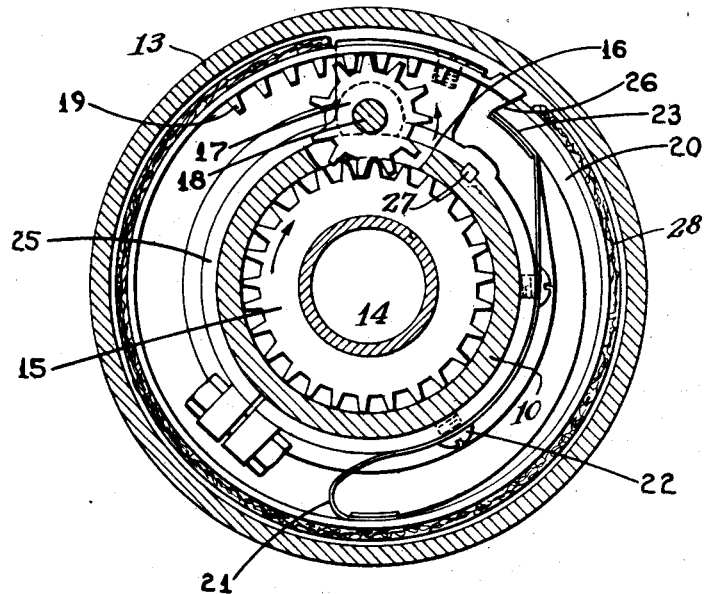
Figure 2 is a transverse section on the line 2—2 of Figure 1.

Referring to the drawing by reference characters, the numeral 10 indicates the stationary axle of the vehicle. Bearing bushings 11 are provided adjacent the opposite ends of the axle and rotatably support spacer members 12, which are rigid with the hub 13. This hub 13 is provided with a series of annular flanges 24 and supports the tire directly, the beads of the tire being received within the flanges 24. A sleeve 14 is arranged within the axle and is co-axial with the hub and axle. This sleeve 14 may be rotated by any suitable means, (not shown), and is provided on its end within the hub with a pinion 15 which is rigid with the sleeve. This pinion is preferably secured to the sleeve in the neighborhood of the plane of symmetry of the wheel. The axle is cut away, as indicated at 16, to provide an opening through which the pinion 15 meshes with a second pinion 17 which is pivotally mounted upon a pin 18 secured in a bearing 25 which is affixed to the axle 10 by means of key 27. This second pinion 17 meshes with a rack 19 secured to the under side of the brake band 20. This brake band, of split annular form, carries friction lining 28 and has its ends bevelled, as indicated at 26. When the brake is in inoperative position these bevelled ends normally abut each other, as clearly shown in Figure 2. The band is of the flexible type and is preferably of tapering form, having its maximum thickness adjacent its anchor point, as also shown in Figure 2 of the drawing. The band is anchored by means of a spring 21 which is secured to the axle and band, as shown at 22 and 23, respectively.

The resiliency of the spring affords a lost motion anchorage which facilitates that wrapping of the brake which is deemed to be so important in this type of brake. By reason of this lost motion anchorage, when the brake is first applied the band is allowed to rotate with the drum for a short period of time during the wrapping action, and thereafter effects a firm and steady braking of the vehicle. The axle 10 is cut away at only a single small part 16 of its periphery in order to allow the intermeshing of the pinions 15 and 17. Throughout the remaining peripheral portion of the axle the pinion teeth bear peripherally against the interior of the axle, the axle thereby affording a bearing within which the pinion rotates upon its tooth ends.

In the actuation of the brake power is applied to the sleeve 14, thereby rotating this sleeve with its pinion 15 and effecting a rotation through this pinion of the pinion 17 and rack 19, and an application of the brake.

It will be seen that I have produced a brake involving a very simple arrangement of parts and a use of the hub 13 not only as a hub but also as a tire carrying member and a braking surface.

Modifications will be obvious to those skilled in the art, and I do not, therefore, wish to be limited except by the terms of my subjoined claims as broadly interpreted in the spirit of my invention in the light of the prior art.

I claim:

1. A vehicle brake comprising, in combination, a cylindrical member having an interior braking surface, a brake shoe within said member, and a pinion co-axial with said cylindrical member, said pinion and brake shoe being interconnected by means including a rack on said shoe for simultaneous actuation.

2. A vehicle brake comprising in combination, a brake drum, a brake shoe within said drum, a rack integral with said shoe on the inner surface thereof, a pinion co-axial with said drum, and means interconnecting said rack and pinion to cause an actuation of the brake when said pinion is rotated.

3. A vehicle brake comprising, in combination, a brake drum, a brake shoe within said drum, a rack on the inner surface of said brake shoe, a pinion co-axial with said brake drum and a second pinion meshing with said rack and said first-named pinion and constituting an operating connection therebetween.

4. A vehicle brake comprising, in combination, a brake drum, a brake shoe, an axle housing concentric with said drum, an actuating pinion within said housing and means interconnecting said pinion and shoe for simultaneous actuation.

5. A vehicle brake comprising, in combination, a brake drum, a brake shoe, a rack on said shoe, a hollow housing concentric with said drum, a pinion within said housing, an opening in the peripheral wall of said housing, a second pinion outside of said housing and meshing with said first-named pinion through the opening in said housing, said second-named pinion also meshing with said rack whereby the rotation of said first-named pinion effects an application of the brake.

6. A vehicle brake comprising, in combination, a brake drum, a brake shoe, a rack on said shoe, a hollow housing concentric with said drum, a pinion within said housing, an opening in the peripheral wall of said housing, a second pinion outside of said housing and meshing with said first-named pinion through the opening in said housing, said second-named pinion also meshing with said rack whereby the rotation of said first-named pinion effects an application of the brake, the teeth of said first-named pinion bearing against the inner peripheral surface of said housing.

7. A vehicle brake comprising, in combination, a hub, a braking surface on the interior of said hub, a brake shoe, and rack and pinion means for actuating said brake shoe.

8. A vehicle brake comprising, in combination, a braking surface, a hollow axle, a brake shoe, a pinion within said hollow axle and means interconnecting the brake shoe and pinion to apply the brake.

9. A vehicle wheel comprising, in combination, a hub, a hollow axle, a braking surface on the interior of said hub, a brake shoe adapted for coaction with said braking surface, a rack associated with said brake shoe, a pinion mounted within said hollow axle with certain of its teeth abutting the inner peripheral wall of the axle, an opening in the peripheral wall of said axle, and a second pinion without said axle meshing with said rack, said last-named pinion meshing with said first-named pinion through the opening in said axle.

10. A vehicle wheel comprising, in combination, an integral brake drum and wheel hub, a brake shoe, pinion operated means to actuate said shoe to apply the brake, and a band spring to anchor said shoe.

11. A vehicle brake comprising, in combination, an integral drum and wheel hub, a brake shoe, a pinion, a rack adjacent one end of said shoe to actuate the same, and circumferentially yieldable resilient means adjacent the opposite end of the shoe to anchor the shoe.

EARL J. W. RAGSDALE.